United States Patent Office.

SAMUEL B. SHAW, OF WEST RANDOLPH, MASSACHUSETTS.

Letters Patent No. 92,376, dated July 6, 1869.

IMPROVED BEVERAGE.

The Schedule referred to in these Letters Patent and making part of the same.

*To all persons to whom these presents may come:*

Be it known that I, SAMUEL B. SHAW, of West Randolph, of the county of Norfolk, and State of Massachusetts, have invented a new and useful Liquid Composition, to be used as a beverage; and I do hereby declare the same to be fully described in the following specification.

In making the said composition, I first prepare a yeast, consisting of the following ingredients, in, or about in the proportions, viz:

About one teaspoonful of lemon-juice;
Two pounds of wheat flour;
One quart of water; and
Three ounces of loaf-sugar.

These I mix well together, and afterwards allow to stand until fermentation takes place.

Next I take about one quart of lemon-juice, about ninety-five quarts of spring water, and twenty pounds of sugar, and mix the whole thoroughly together, and with the yeast, as above described.

The mixture is next to be suffered to stand about twelve hours, or until fermentation has taken place, after which it may be bottled for use. The composition thus made I term "citronale." It is a very cooling and refreshing beverage.

I claim, as my invention—

The composition, or "citronale," as above specified.

Also, the composition or yeast, as hereinbefore described, as engaged in the making of such beverage.

S. B. SHAW.

Witnesses:
WARREN SHAW,
JOHN G. POOLE.